US011809452B2

(12) United States Patent
Devan et al.

(10) Patent No.: US 11,809,452 B2
(45) Date of Patent: Nov. 7, 2023

(54) METHOD AND SYSTEM FOR DATA SYNCHRONIZATION

(71) Applicant: JPMorgan Chase Bank, N.A., New York, NY (US)

(72) Inventors: Stanley M Devan, Mount Royal, NJ (US); Satyajit Arivukkodi Krishnamurthy, New Albany, OH (US); Naga Virajitha Kommera, Delaware, OH (US); David Anthony Quesenberry, Westerville, OH (US); Kenneth L. Nieman, Clarendon Hills, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 287 days.

(21) Appl. No.: 17/444,870

(22) Filed: Aug. 11, 2021

(65) Prior Publication Data
US 2023/0051934 A1 Feb. 16, 2023

(51) Int. Cl.
*G06F 11/00* (2006.01)
*G06F 16/27* (2019.01)
*G06F 11/07* (2006.01)
*G06F 16/23* (2019.01)
*G06F 11/20* (2006.01)

(52) U.S. Cl.
CPC .......... *G06F 16/273* (2019.01); *G06F 11/073* (2013.01); *G06F 11/0727* (2013.01); *G06F 11/0751* (2013.01); *G06F 11/0793* (2013.01); *G06F 11/2064* (2013.01);
(Continued)

(58) Field of Classification Search
CPC ............. G06F 11/0703; G06F 11/0706; G06F 11/0727; G06F 11/073; G06F 11/0751; G06F 11/0793; G06F 11/14; G06F 11/1402; G06F 11/1448; G06F 11/1458; G06F 11/1479; G06F 11/1658; G06F 11/2053; G06F 11/2064; G06F 11/2082; G06F 11/2097; G06F 16/23; G06F 16/2379; G06F 16/2386; G06F 16/27; G06F 16/273;
(Continued)

(56) References Cited

U.S. PATENT DOCUMENTS 5,710,922 A * 1/1998 Alley .................... G06F 16/273
6,516,327 B1 * 2/2003 Zondervan ............ G06F 16/275
(Continued)

FOREIGN PATENT DOCUMENTS

CN 104615759 A * 5/2015 ............. G06F 16/27
CN 110807067 A * 2/2020

*Primary Examiner* — Anthony J Amoroso
(74) *Attorney, Agent, or Firm* — Greenblum & Bernstein, P.L.C.

(57) ABSTRACT

A method for facilitating data synchronization across a plurality of platforms is provided. The method includes retrieving a change event, the change event corresponding to an event stream from a first platform; parsing the change event to identify a record and a data operation; examining a synchronization database to determine whether a corresponding record is persisted in a database of a second platform; inserting the record into the synchronization database when the corresponding record is not persisted in the platform, the inserted record including a change indicator; and updating, by using the synchronization database, the database of the second platform to include the record.

20 Claims, 10 Drawing Sheets

(52) U.S. Cl.
CPC .......... *G06F 16/2379* (2019.01); *G06F 16/27* (2019.01); *G06F 2201/00* (2013.01); *G06F 2201/82* (2013.01)

(58) Field of Classification Search
CPC .. G06F 16/275; G06F 16/278; G06F 2201/80; G06F 2201/82
See application file for complete search history.

(56) References Cited

U.S. PATENT DOCUMENTS

| | | | |
|---|---|---|---|
| 11,438,133 B2* | 9/2022 | Chen | H04L 41/0853 |
| 2005/0289198 A1* | 12/2005 | Todd | G06F 16/273 |
| 2006/0106881 A1* | 5/2006 | Leung | G06F 16/273 |
| 2010/0106684 A1* | 4/2010 | Pizzo | G06F 16/275 707/610 |
| 2021/0303421 A1* | 9/2021 | Roterring | G06F 11/2097 |

* cited by examiner

METHOD AND SYSTEM FOR DATA SYNCHRONIZATION

BACKGROUND

1. Field of the Disclosure

This technology generally relates to methods and systems for data synchronization, and more particularly to methods and systems for synchronizing data across a plurality of platforms to facilitate data migration and data reconciliation.

2. Background Information

Many business entities operate expansive technology platforms that provide services for users and/or client applications. Often, to modernize and/or replace an existing technology platform, the business entities must switch from one technology platform to another. Historically, conventional techniques for managing data across two different technology platforms have resulted in varying degrees of success with respect to minimizing impacts to the users and/or the client applications as well as maintaining data synchronization across the two technology platforms.

One drawback of using conventional techniques for managing data across two different technology platforms is that in many instances, data updates may independently occur in each of the two different technology platforms. As a result, synchronization of data accessible across the two different technology platforms is challenging since each of the two different technology platforms must represent the latest information. In addition, user experience and/or client application productivity greatly diminish as a result of disruptions caused by inadequate data synchronization.

Therefore, there is a need for a tool that facilitates data migration and data reconciliation across a plurality of technology platforms by consuming event streams to manage data synchronization as well as validate common data elements.

SUMMARY

The present disclosure, through one or more of its various aspects, embodiments, and/or specific features or sub-components, provides, inter alia, various systems, servers, devices, methods, media, programs, and platforms for synchronizing data across a plurality of platforms to facilitate data migration and data reconciliation.

According to an aspect of the present disclosure, a method for facilitating data synchronization across a plurality of platforms is provided. The method is implemented by at least one processor. The method may include retrieving at least one change event, the at least one change event may correspond to an event stream from at least one first platform; parsing the at least one change event to identify at least one record and at least one data operation; examining at least one synchronization database to determine whether at least one corresponding record is persisted in a database of at least one second platform; inserting the at least one record into the at least one synchronization database when the at least one corresponding record is not persisted in the at least one second platform, the inserted at least one record may include a change indicator; and updating, by using the at least one synchronization database, the database of the at least one second platform to include the at least one record.

In accordance with an exemplary embodiment, the method may further include determining, after the updating, whether the database of the at least one second platform includes the at least one record; flagging, based on a result of the determining, the inserted at least one record in the synchronization database; and generating, based on the flagging, at least one service ticket, the at least one service ticket may include information that relates to at least one from among the result of the determining and the inserted at least one record in the synchronization database.

In accordance with an exemplary embodiment, the method may further include generating at least one event message that includes the at least one record; and transmitting the at least one event message to at least one from among the at least one first platform and the at least one second platform to facilitate event auditing.

In accordance with an exemplary embodiment, the at least one record may be translated based on a characteristic of the at least one second platform prior to the updating.

In accordance with an exemplary embodiment, the change indicator may include at least one identifier that represents at least one from among the at least one first platform and the at least one second platform.

In accordance with an exemplary embodiment, the method may further include identifying, by using the change indicator, at least one insertion order for each of a plurality of records in the at least one synchronization database; and determining an event stream direction by using the identified at least one insertion order.

In accordance with an exemplary embodiment, the method may further include extracting at least one time value for each of a plurality of records in the synchronization database; and determining at least one latency value based on the extracted at least one time value.

In accordance with an exemplary embodiment, the method may further include identifying at least one feature based on a plurality of records in the synchronization database, the at least one feature may relate to an individual trait of a data phenomenon; and generating, by using the at least one feature, at least one model, the at least one model may represent a pattern of errors that relate to the plurality of records in the synchronization database.

In accordance with an exemplary embodiment, the method may further include identifying, by using the generated at least one model, at least one error condition based on the inserted at least one record; and automatically initiating at least one repair action to resolve the identified at least one error condition.

In accordance with an exemplary embodiment, the method may further include generating at least one dashboard based on a plurality of records in the at least one synchronization database, the at least one dashboard may include information relating to at least one from among an event stream direction, a latency value, an error condition, a repair action, an unprocessed workflow, and an event failure rate; and displaying, via a graphical user interface, the at least one dashboard.

According to an aspect of the present disclosure, a computing device configured to implement an execution of a method for facilitating data synchronization across a plurality of platforms is disclosed. The computing device comprising a processor; a memory; and a communication interface coupled to each of the processor and the memory, wherein the processor may be configured to retrieve at least one change event, the at least one change event may correspond to an event stream from at least one first platform; parse the at least one change event to identify at least one record and at least one data operation; examine at least one synchronization database to determine whether at least one corresponding record is persisted in a database of at least one second platform; insert the at least one record in the at least one synchronization database when the at least one corresponding record is not persisted in the at least one second platform, the inserted at least one record may include a change indicator; and update, by using the at least one synchronization database, the database of the at least one second platform to include the at least one record.

In accordance with an exemplary embodiment, the processor may be further configured to determine, after the updating, whether the database of the at least one second platform includes the at least one record; flag, based on a result of the determining, the inserted at least one record in the synchronization database; and generate, based on the flagging, at least one service ticket, the at least one service ticket may include information that relates to at least one from among the result of the determining and the inserted at least one record in the synchronization database.

In accordance with an exemplary embodiment, the processor may be further configured to generate at least one event message that includes the at least one record; and transmit the at least one event message to at least one from among the at least one first platform and the at least one second platform to facilitate event auditing.

In accordance with an exemplary embodiment, prior to the updating, the processor may be further configured to translate the at least one record based on a characteristic of the at least one second platform.

In accordance with an exemplary embodiment, the change indicator may include at least one identifier that represents at least one from among the at least one first platform and the at least one second platform.

In accordance with an exemplary embodiment, the processor may be further configured to identify, by using the change indicator, at least one insertion order for each of a plurality of records in the at least one synchronization database; and determine an event stream direction by using the identified at least one insertion order.

In accordance with an exemplary embodiment, the processor may be further configured to extract at least one time value for each of a plurality of records in the synchronization database; and determine at least one latency value based on the extracted at least one time value.

In accordance with an exemplary embodiment, the processor may be further configured to identify at least one feature based on a plurality of records in the synchronization database, the at least one feature may relate to an individual trait of a data phenomenon; and generate, by using the at least one feature, at least one model, the at least one model may represent a pattern of errors that relate to the plurality of records in the synchronization database.

In accordance with an exemplary embodiment, the processor may be further configured to identify, by using the generated at least one model, at least one error condition based on the inserted at least one record; and automatically initiate at least one repair action to resolve the identified at least one error condition.

In accordance with an exemplary embodiment, the processor may be further configured to generate at least one dashboard based on a plurality of records in the at least one synchronization database, the at least one dashboard may include information relating to at least one from among an event stream direction, a latency value, an error condition, a repair action, an unprocessed workflow, and an event failure rate; and display, via a graphical user interface, the at least one dashboard.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
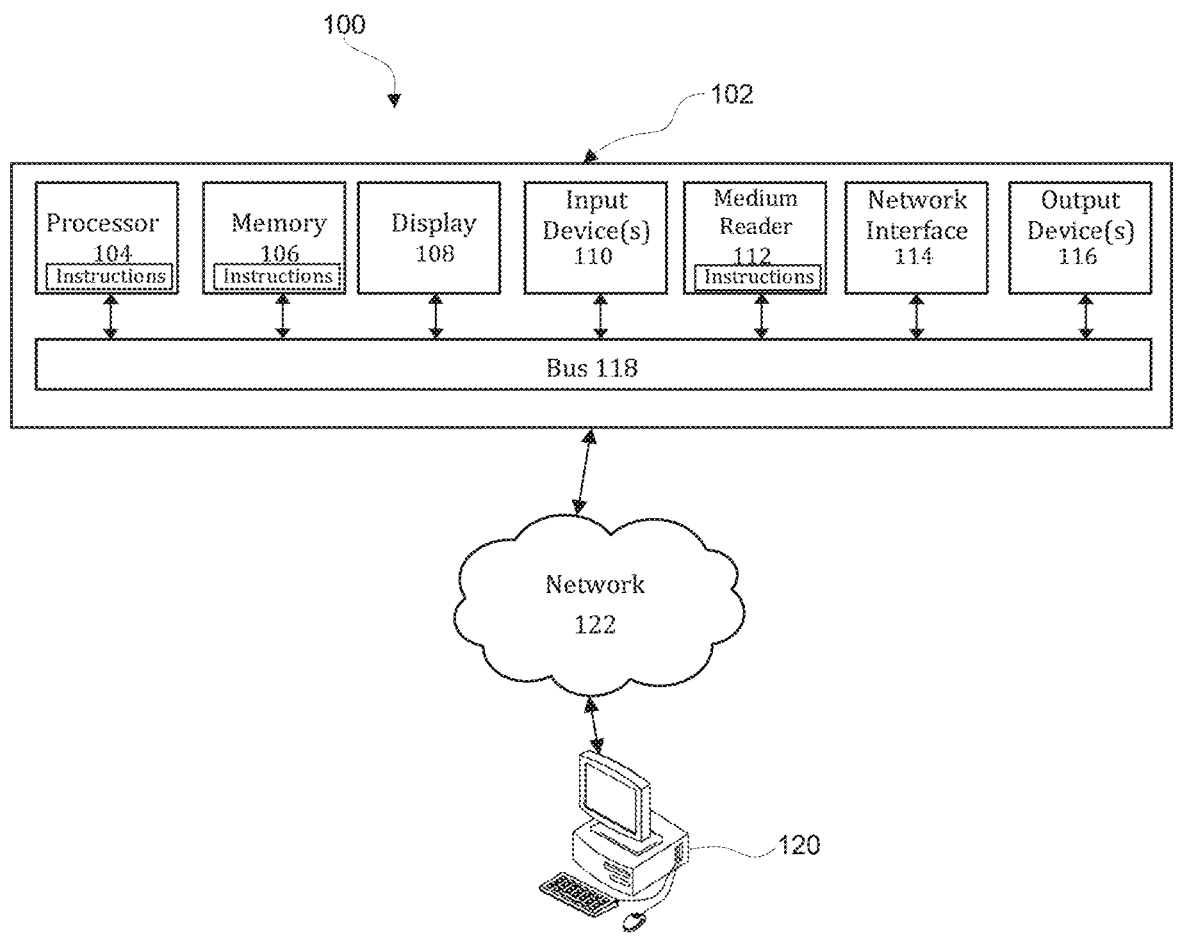
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for synchronizing data across a plurality of platforms to facilitate data migration and data reconciliation.

Figure 2:
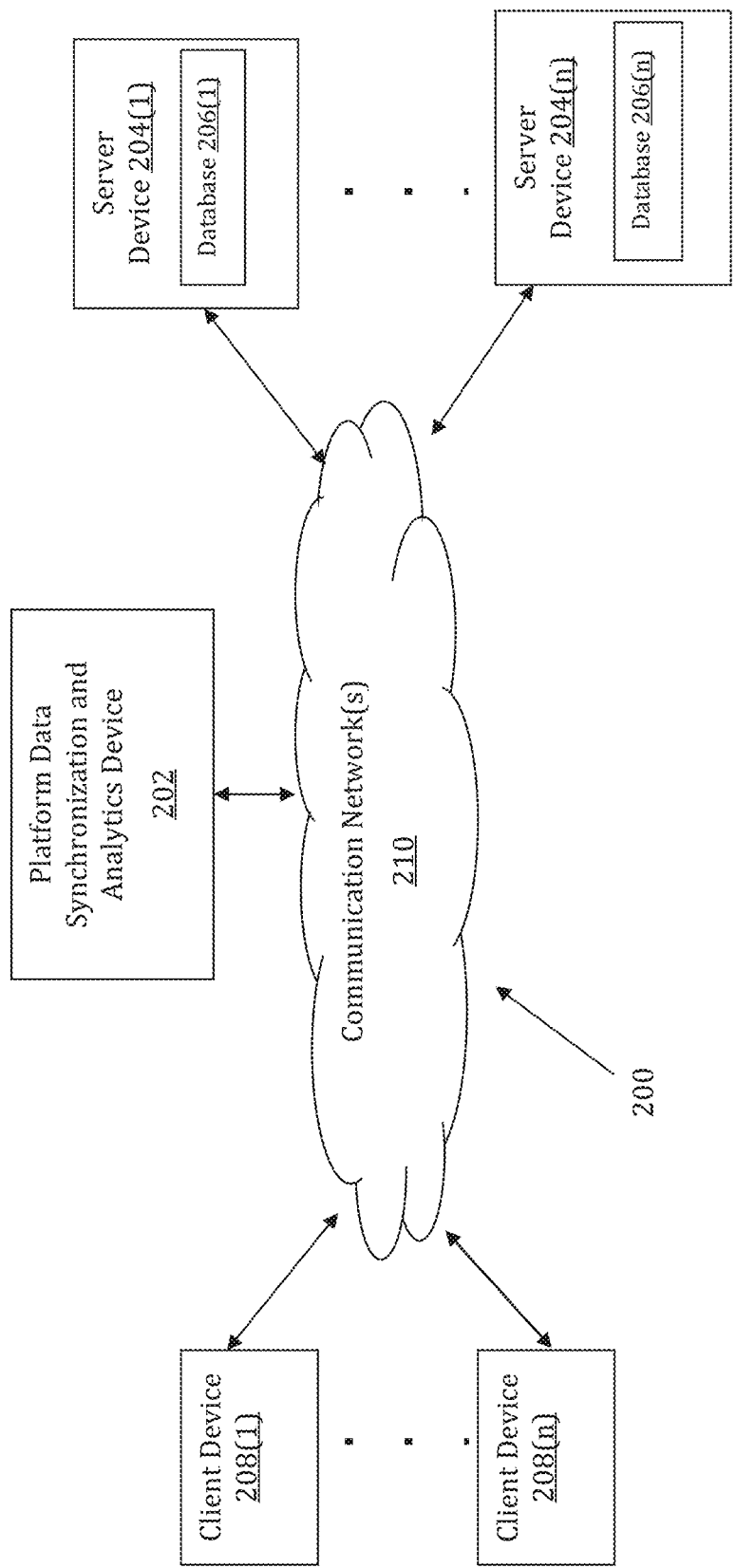
FIG. 2 illustrates an exemplary diagram of a network environment.

Referring to FIG. 2, a schematic of an exemplary network environment 200 for implementing a method for synchronizing data across a plurality of platforms to facilitate data migration and data reconciliation is illustrated. In an exemplary embodiment, the method is executable on any networked computer platform, such as, for example, a personal computer (PC).

The method for synchronizing data across a plurality of platforms to facilitate data migration and data reconciliation may be implemented by a Platform Data Synchronization and Analytics (PDSA) device 202. The PDSA device 202 may be the same or similar to the computer system 102 as described with respect to FIG. 1. The PDSA device 202 may store one or more applications that can include executable instructions that, when executed by the PDSA device 202, cause the PDSA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PDSA device 202 itself, may be located in virtual server(s) running in a cloud-based computing environment rather than being tied to one or more specific physical network computing devices. Also, the application(s) may be running in one or more virtual machines (VMs) executing on the PDSA device 202. Additionally, in one or more embodiments of this technology, virtual machine(s) running on the PDSA device 202 may be managed or supervised by a hypervisor.

In the network environment 200 of FIG. 2, the PDSA device 202 is coupled to a plurality of server devices 204(1)-204(n) that hosts a plurality of databases 206(1)-206(n), and also to a plurality of client devices 208(1)-208(n) via communication network(s) 210. A communication interface of the PDSA device 202, such as the network interface 114 of the computer system 102 of FIG. 1, operatively couples and communicates between the PDSA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PDSA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PDSA devices that efficiently implement a method for synchronizing data across a plurality of platforms to facilitate data migration and data reconciliation.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PDSA device 202 may be a standalone device or integrated with one or more other devices or apparatuses, such as one or more of the server devices 204(1)-204(n), for example. In one particular example, the PDSA device 202 may include or be hosted by one of the server devices 204(1)-204(n), and other arrangements are also possible. Moreover, one or more of the devices of the PDSA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PDSA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to change event data, event message data, event stream data, records data, operations data, service ticket data, feature data, model data, stream direction data, latency data, error conditions data, repair actions data, unprocessed workflow data, and event failure rate data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the PDSA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PDSA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the PDSA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PDSA device 202, the server devices 204(1)-204(n), or the client devices 208(1)-208(n), for example, may be configured to operate as virtual instances on the same physical machine. In other words, one or more of the PDSA device 202, the server devices 204(1)-204(n), or the client devices 208(1)-208(n) may operate on the same physical device rather than as separate devices communicating through communication network(s) 210. Additionally, there may be more or fewer PDSA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
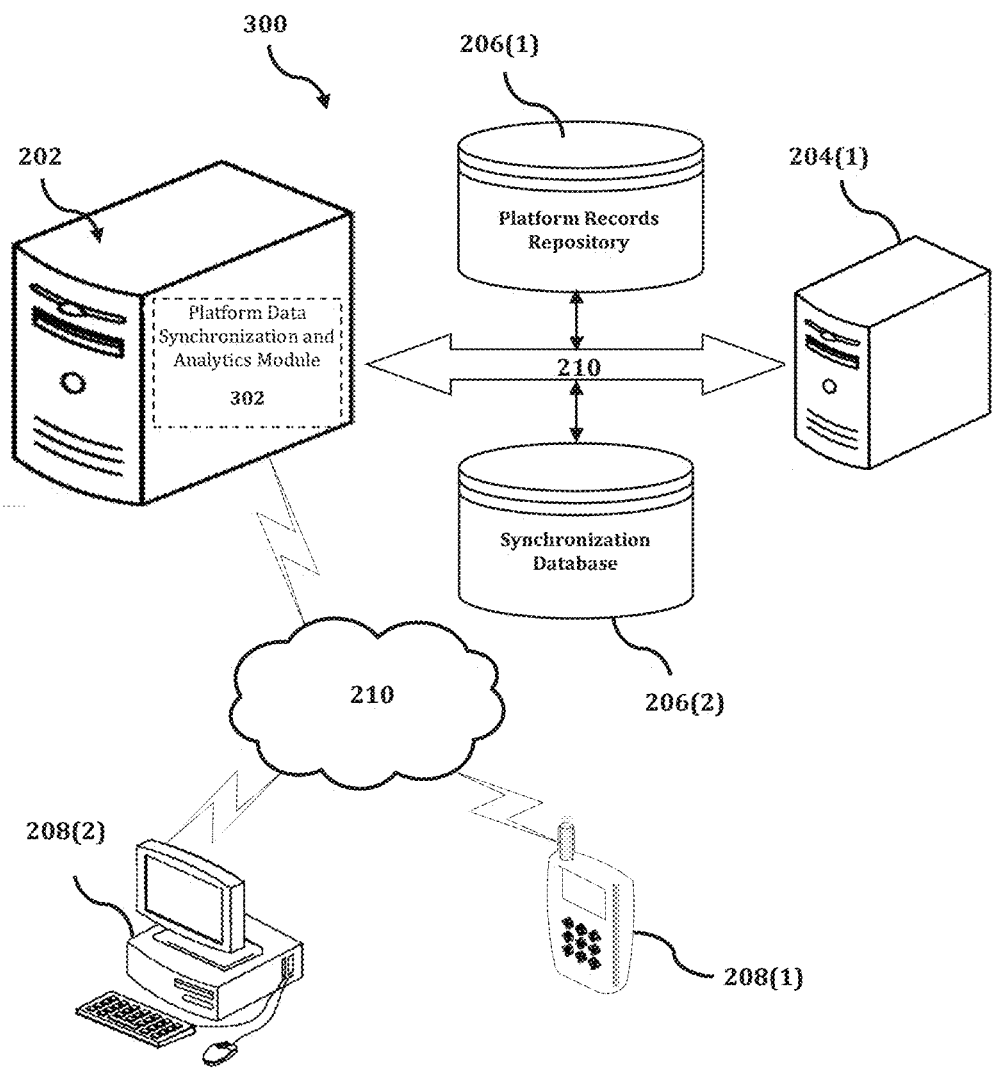
FIG. 3 shows an exemplary system for implementing a method for synchronizing data across a plurality of platforms to facilitate data migration and data reconciliation.

The PDSA device 202 is described and shown in FIG. 3 as including a platform data synchronization and analytics module 302, although it may include other rules, policies, modules, databases, or applications, for example. As will be described below, the platform data synchronization and analytics module 302 is configured to implement a method for synchronizing data across a plurality of platforms to facilitate data migration and data reconciliation.

An exemplary process 300 for implementing a mechanism for synchronizing data across a plurality of platforms to facilitate data migration and data reconciliation by utilizing the network environment of FIG. 2 is shown as being executed in FIG. 3. Specifically, a first client device 208(1) and a second client device 208(2) are illustrated as being in communication with PDSA device 202. In this regard, the first client device 208(1) and the second client device 208(2) may be "clients" of the PDSA device 202 and are described herein as such. Nevertheless, it is to be known and understood that the first client device 208(1) and/or the second client device 208(2) need not necessarily be "clients" of the PDSA device 202, or any entity described in association therewith herein. Any additional or alternative relationship may exist between either or both of the first client device 208(1) and the second client device 208(2) and the PDSA device 202, or no relationship may exist.

Further, PDSA device 202 is illustrated as being able to access a platform records repository 206(1) and a synchronization database 206(2). The platform data synchronization and analytics module 302 may be configured to access these databases for implementing a method for synchronizing data across a plurality of platforms to facilitate data migration and data reconciliation.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PDSA device 202 via broadband or cellular communication. Of course, these embodiments are merely exemplary and are not limiting or exhaustive.

Upon being started, the platform data synchronization and analytics module 302 executes a process for synchronizing data across a plurality of platforms to facilitate data migration and data reconciliation. An exemplary process for synchronizing data across a plurality of platforms to facilitate data migration and data reconciliation is generally indicated at flowchart 400 in FIG. 4.

Figure 4:
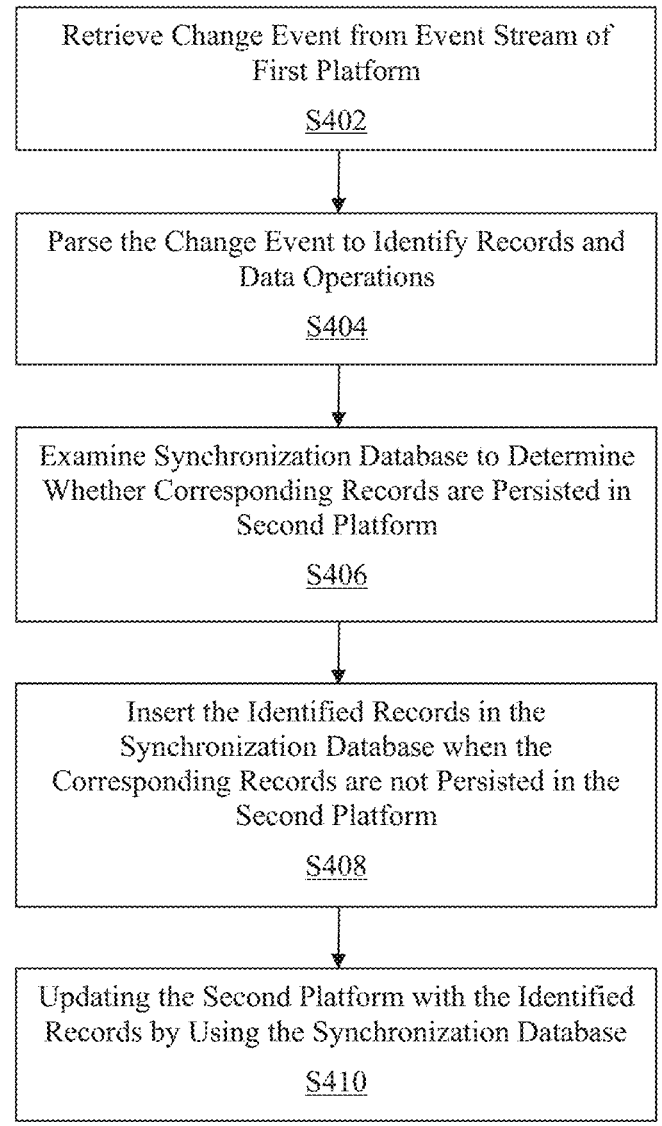
FIG. 4 is a flowchart of an exemplary process for implementing a method for synchronizing data across a plurality of platforms to facilitate data migration and data reconciliation.

In the process 400 of FIG. 4, at step S402, a change event that corresponds to an event stream from a first platform may be retrieved. In an exemplary embodiment, an event stream may capture data in real-time from event sources such as, for example, databases, sensors, mobile devices, cloud services, and applications. The event stream may capture events for each of the event sources in the form of a continuous stream of events. The captured events may be persisted, manipulated, processed, and routed to different destination technologies as needed. In another exemplary embodiment, the event stream may ensure a continuous flow and interpretation of data for users and/or applications. As will be appreciated by a person of ordinary skill in the art, the change event may be retrieved from a plurality of platforms via a shared, standard event store and externalized domain specific components for mapping attributes from the change event to application programming interfaces (APIs) that correspond to each of the plurality of platforms to facilitate record decoupling in a throttled data migration.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the change event may be parsed to identify a record and a data operation. In an exemplary embodiment, the change event may correspond to a user request for a modification in an event source. For example, the change event may correspond to a user request to change a name in at least one of a plurality of platform databases. In another exemplary embodiment, the record may relate to a data package that corresponds to the user modification request. For example, the record may relate to a data package that contains a name for the requested name change. In another exemplary embodiment, the data operation may relate to instructions that corresponds to the user modification request. The data operation may correspond to at least one from among a seeder operation, a read operation, a retrieve operation, a write operation, a change operation, a data audit operation, as well as an initialize and resynchronization operation.

At step S406, a synchronization database may be examined to determine whether a corresponding record is persisted in a database of a second platform. The synchronous database may correspond to a shared, standard event store that is usable to facilitate data synchronization across a plurality of platforms. In an exemplary embodiment, the synchronization database may correspond to an externalized data store that is fed through events. The synchronization database may be used to track events from the plurality of platforms. In an exemplary embodiment, the synchronization database may connect to the plurality of platforms via an anti-corruption layer (ACL). As will be appreciated by a person of ordinary skill in the art, the synchronization database may correspond to an organized collection of data that is stored and accessible electronically via a computer system.

At step S408, the record may be inserted into the synchronization database when the corresponding record is not persisted in the second platform. In another exemplary embodiment, the inserted record may include a change indicator. The change indicator may include an identifier that represents at least one from among the first platform and the second platform. For example, when the corresponding record is not persisted in the second platform, the record may be inserted into the synchronization database together with a change indicator that signifies a change in the first platform.

In another exemplary embodiment, an insertion order may be identified for each of the plurality of records in the synchronization database by using the change indicator. Then, an event stream direction may be determined by using the identified insertion order. For example, by knowing which record was inserted first into the synchronization database, a determination may be made as to which side the change was made on as well as the direction of the data flow.

In another exemplary embodiment, a time value may be extracted for each of a plurality of records in the synchronization database. A latency value may be determined based on the extracted time value. For example, by knowing a starting time value and an ending time value of each of the event messages, a calculation may be performed to determine a round trip time of a particular change event. In another exemplary embodiment, a separate process consistent with disclosures in the present application may be initiated to log and calculate stand-in times.

In another exemplary embodiment, unprocessed workflows may be determined by using information in the synchronization database. The unprocessed workflows may include at least one from among a workflow that has not completed an event processing round trip and a workflow that does not match a corresponding key and/or index. In an exemplary embodiment, a check may be implemented to detect workflows that do not match a corresponding key and/or index, which may continuously loop. A service ticket may be automatically generated for each of the detected workflows that do not match a corresponding key and/or index.

At step S410, the database of the second platform may be updated by using the synchronization database to include the record. In an exemplary embodiment, the record may be translated based on a characteristic of the second platform prior to the updating. The characteristic of the second platform may correspond to a data constraint of the second platform. For example, the data constraint may relate to a data type and a data format.

In another exemplary embodiment, whether the database of the second platform includes the record may be determined. The inserted record in the synchronization database may be flagged based on a result of the determining. Then, a service ticket may be generated based on the flagging. In another exemplary embodiment, the service ticket may include information that relates to at least one from among the result of the determining and the inserted record in the synchronization database.

In another exemplary embodiment, a feature may be identified based on a plurality of records in the synchronization database. The feature may relate to an individual trait of a data phenomenon. Then, a model may be generated by using the identified feature. The model may represent a pattern of errors that relate to the plurality of records in the synchronization database. In another exemplary embodiment, the model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges. In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, an error condition may be identified by using the generated model. For example, the error condition may correspond to a failed update of at least one from among the synchronization database, a database of the first platform, and a database of the second platform. In another exemplary embodiment, a repair action may be automatically initiated without further user intervention. The automatically initiated repair action may be initiated to resolve the identified error condition. In another exemplary embodiment, a notification may be generated when the error condition has been identified and automatically resolved. The notification may include information relating to the error condition and the automatically initiated repair action.

In another exemplary embodiment, required user intervention may be determined by using the generated model for a particular error condition. When user intervention is deemed necessary, the notification may include information relating to the error condition as well as a suggested repair action that has been automatically determined by using the generated model. In another exemplary embodiment, the notification may include a listing of automatically initiated repair actions as well as a listing of error conditions that require manual repair and reprocessing.

In another exemplary embodiment, an event message that includes the record may be generated. The generated event message may be transmitted to at least one from among the first platform and the second platform to facilitate event auditing. In another exemplary embodiment, a dashboard may be generated based on a plurality of records in the synchronization database. The dashboard may include information that relates to at least one from among an event stream direction, a latency value, an error condition, a repair action, an unprocessed workflow, and an event failure rate. In another exemplary embodiment, the generated dashboard may be displayed via a graphical user interface.

In another exemplary embodiment, the disclosed data synchronization process may be utilized to migrate data between a plurality of platforms. The throttled data migration process may correspond to a migration strategy for the migration of data from one platform to another. In another exemplary embodiment, the migration strategy may utilize implementation levels to facilitate the throttled migration process. The implementation levels may include implementation level 0, implementation level 1, implementation level 2, implementation level 3, implementation level 4, and a target state level. As will be appreciated by a person of ordinary skill in the art, the implementation levels may include any number of levels based on migration requirements and a number of target platforms.

For example, in implementation level 0, a current state architecture may rely on large monolithic systems of record (SOR) that may be difficult and costly to change. Middleware may be required to orchestrate requests across multiple systems to solve for ad hoc needs, which may create multiple dependencies. Implementation level 0 may be seen as the status quo. In implementation level 1, application programming interfaces (APIs) such as, for example, representational state transfer (REST) APIs may be provided to access functionality and data that are still hosted in legacy platforms. The APIs may be defined based on a target state domain model and may implement relevant business rules. Business events may be published in place of change data capture events. Implementation level 1 may enable business event adoption by providing client application interfaces that will align with a target state, which allows for changes to back-end data sources without impacting users and/or applications that are currently using the legacy platform.

In implementation level 2, migration of systems of record (SOR) data to a distributed database platform may begin to support inquiry volume. The REST API from implementation level 1 and event interfaces may continue to be extended based on domain definition. Synchronization with legacy databases may be supported. Implementation level 2 may enable cost savings from volume migration of platform data, which offloads volume from legacy database platforms and infrastructure. In implementation level 3, complete migration of data may be initiated for a given functional capability. Implementation level 3 may move additional inquiry volume off legacy platforms.

In implementation level 4, maintenance capabilities may be incorporated on distributed database platforms and the SOR may be moved from the legacy platform. Synchronization capabilities may be extended to ensure that the legacy platform is kept up to date during client migration. Implementation level 4 may enable "kill the tail" strategy to deprecate legacy platforms. Functionalities may also be extended without requiring throwaway development or coordination. In the target state level, the domain may be implemented through autonomous services. As such, legacy platforms as well as legacy interfaces may be deprecated. The target state may meet established target state objectives and eliminate legacy complexities.

Figure 5:
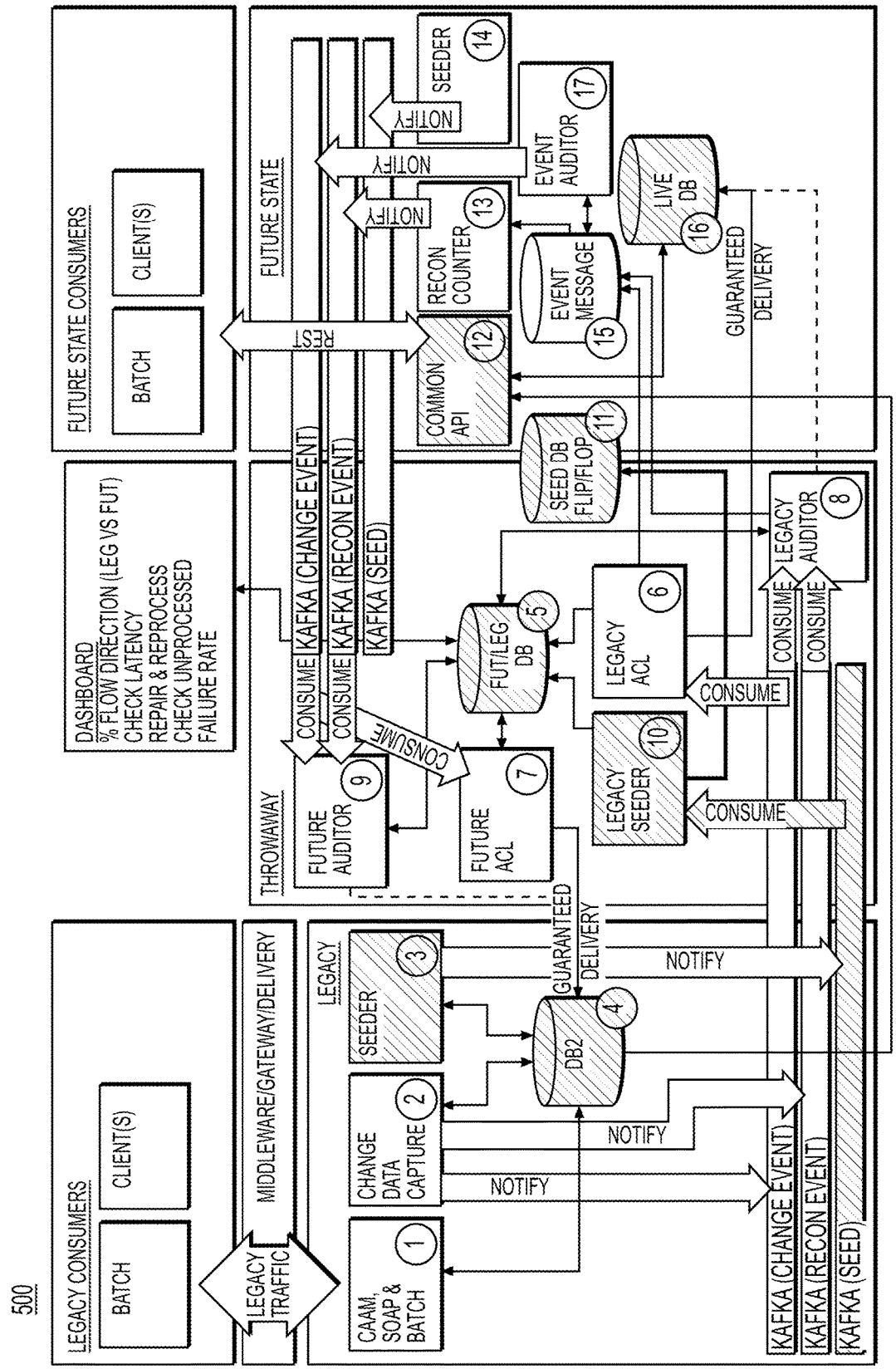
FIG. 5 is a flow diagram of an exemplary seeding process for implementing a method for synchronizing data across a plurality of platforms to facilitate data migration and data reconciliation.

FIG. 5 is a flow diagram 500 of an exemplary seeding process for implementing a method for synchronizing data across a plurality of platforms to facilitate data migration and data reconciliation. In FIG. 5, a legacy seeder may be utilized to seed name data.

As illustrated in FIG. 5, legacy seeder 10 may be used to initially populate data in live database (DB) 16. Legacy seeder 10 may also be utilized to find bad data in live DB 16 and repopulate seed DB 11 with minimal to no downtime. In an exemplary embodiment, legacy seeder 3 may be initiated based on a predetermined schedule such as, for example, once a week during the weekends as well as once a month during the weekends. All data may be read from DB2 4 to populate an event streaming platform such as, for example, KAFKA via the legacy seeder 3.

Figure 6:
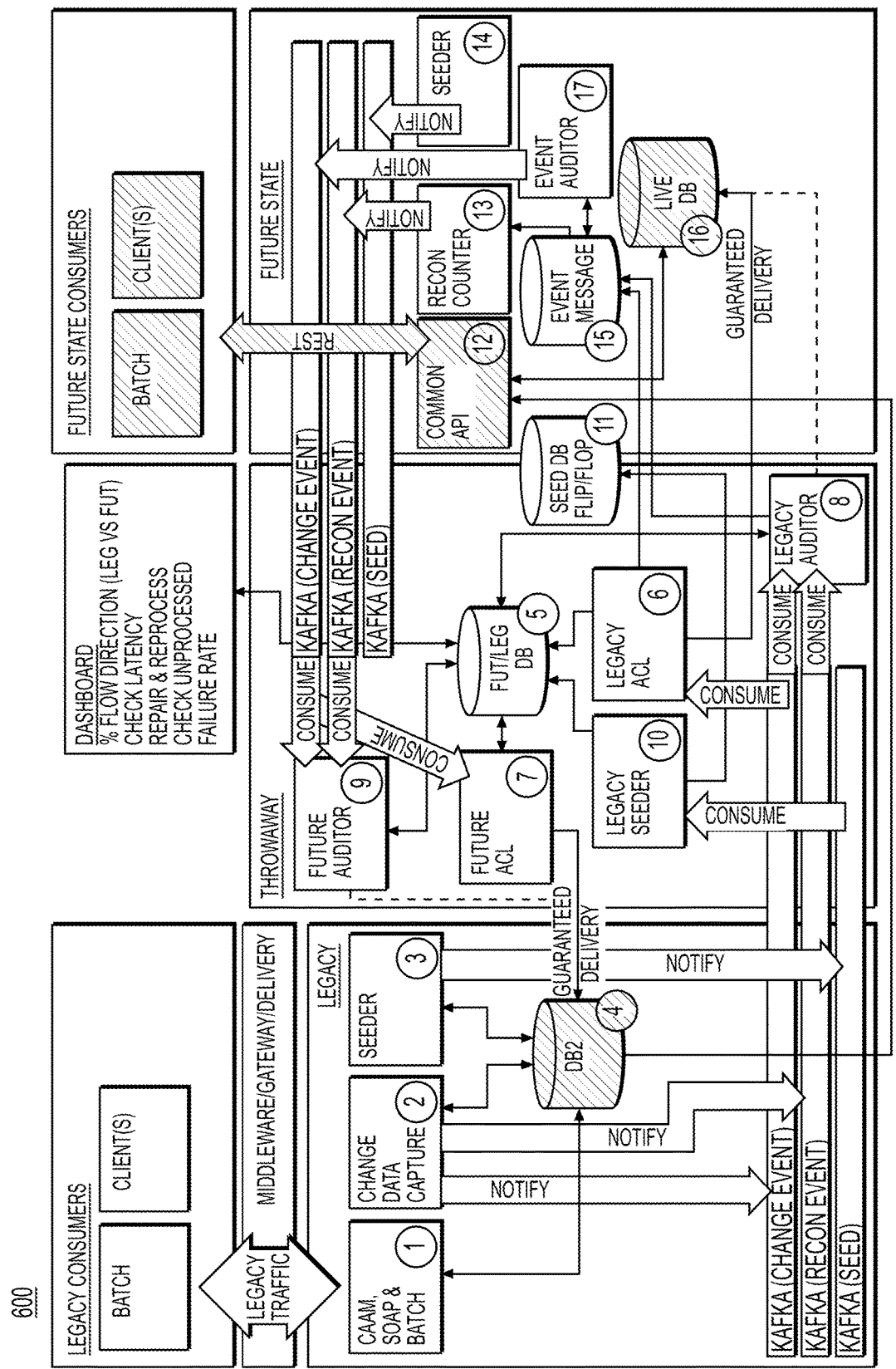
FIG. 6 is a flow diagram of an exemplary inquiring process for implementing a method for synchronizing data across a plurality of platforms to facilitate data migration and data reconciliation.

FIG. 6 is a flow diagram 600 of an exemplary inquiring process for implementing a method for synchronizing data across a plurality of platforms to facilitate data migration and data reconciliation. In FIG. 6, a name inquiry process may be initiated via a target platform.

As illustrated in FIG. 6, a client system may perform a name inquiry via a name API such as common API 12. The common API 12 may retrieve the name from live DB 15. Based on a throttle percentage in the aspect-oriented programming (AOP) paradigm, the common API 12 may retrieve the name from live DB 16 and compare the name to DB2 4. When the name differs between the two databases, the common API 12 may replace the name from the object in the live DB 16 with the name from DB2 4 since DB2 4 is the trusted system of record (SOR). The common API 12 may then open a ticket for review of the difference and return the retrieved name to the client.

Figure 7:
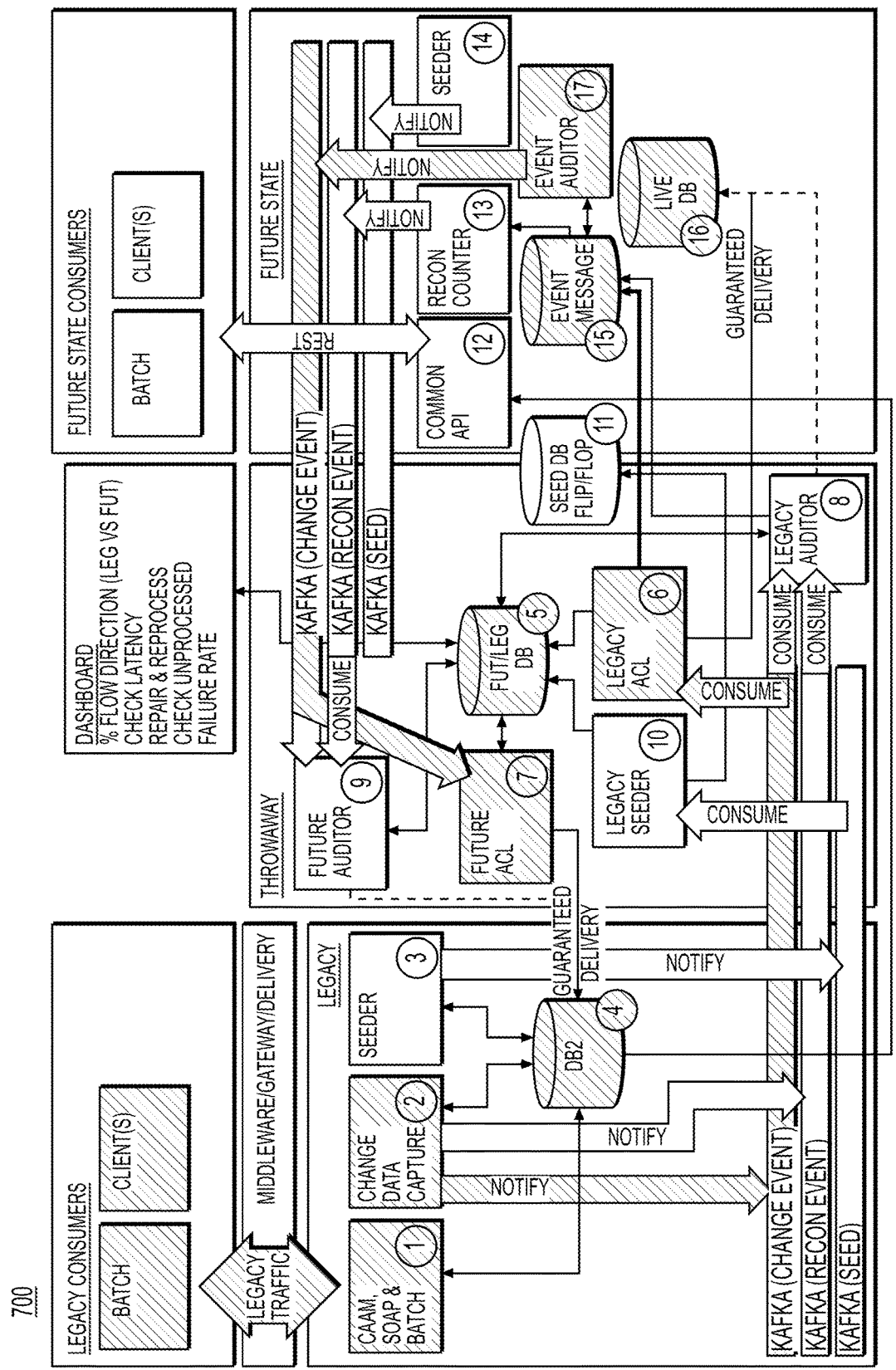
FIG. 7 is a flow diagram of an exemplary legacy change process for implementing a method for synchronizing data across a plurality of platforms to facilitate data migration and data reconciliation.

FIG. 7 is a flow diagram 700 of an exemplary legacy change process for implementing a method for synchronizing data across a plurality of platforms to facilitate data migration and data reconciliation. In FIG. 7, a legacy name change request may be initiated via a legacy platform.

As illustrated in FIG. 7, a user may request a name change via existing communication protocol 1 of the legacy platform. The existing DB2 4 may be updated with the new name. Change data capture 2 may then process the change request by putting the name change on an event streaming platform such as, for example, KAFKA as a change event. Legacy anti-corruption layer (ACL) 6 may pull the change request and check fut/leg DB 5 to see whether the record exists in the target platform. In an exemplary embodiment, the fut/leg DB 5 may correspond to the synchronization database consistent with disclosures in the present application. For name changes, the record does not exist in the target platform and so, the legacy ACL 6 may insert the record in fut/leg DB 5 as a legacy platform change. The legacy ACL 6 may translate the data, when necessary, insert the record into event message 15, and update the live DB 16. When either of the updates fail, the fut/leg DB record may be flagged as failed and a service ticket may be opened.

Event auditor 17 may then identify unprocessed events and place the record on an event streaming platform such as, for example, KAFKA as a business change event. Event auditor 17 may also mark the record as processed. Subsequently, future ACL 7 may pull the change request and check fut/leg DB 5 to determine whether the record exists in the legacy platform. Since the legacy platform has been updated, the record exists in the legacy platform and the future ACL 7 marks the updated record as complete. When the update fails, the fut/leg DB record may be flagged as failed and a service ticket may be opened. Consistent with disclosures in the present application, legacy ACL 6 and future ACL 7 may selfheal the records when an update failure is identified.

Figure 8:
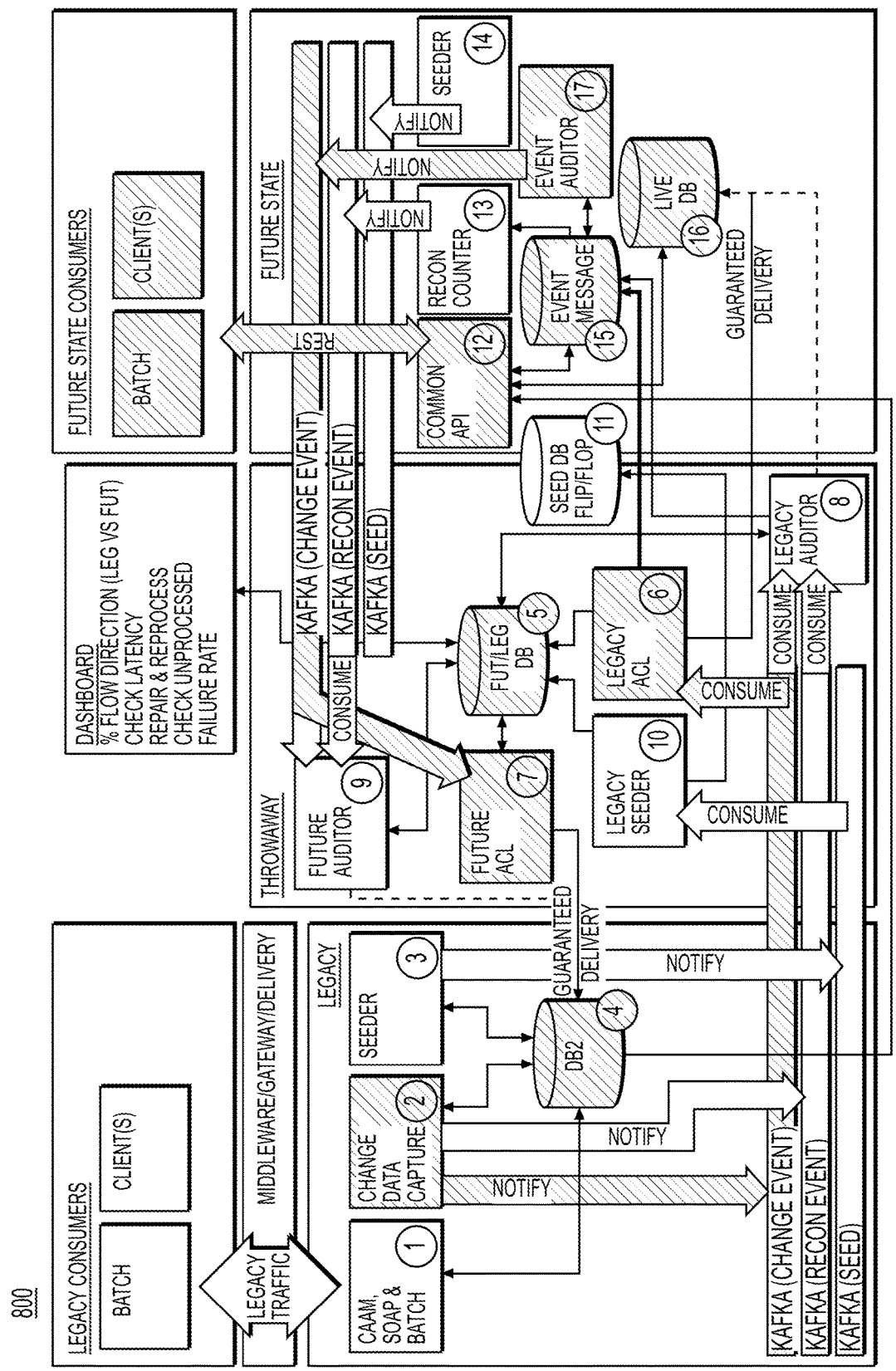
FIG. 8 is a flow diagram of an exemplary future change process for implementing a method for synchronizing data across a plurality of platforms to facilitate data migration and data reconciliation.

FIG. 8 is a flow diagram 800 of an exemplary future change process for implementing a method for synchronizing data across a plurality of platforms to facilitate data migration and data reconciliation. In FIG. 8, a target name change request may be initiated via a target platform.

As illustrated in FIG. 8, a user may request a name change via common API 12. The existing live DB 16 may then be updated with the new name and a business change event may be added to event message 15. Event auditor 17 may find unprocessed events and place a business change event on an event streaming platform such as, for example, KAFKA. The event auditor 17 may mark the record as processed.

Future ACL 7 may then pull the change request and check fut/leg DB 5 to identify whether the record exists in the legacy platform. In an exemplary embodiment, the fut/leg DB 5 may correspond to the synchronization database consistent with disclosures in the present application. For name changes, the record does not exist in the legacy platform and so the future ACL 7 may insert the record in fut/leg DB 5 as a target platform change and may update DB2 4. When the update fails, the fut/leg DB record may be flagged as failed and a service ticket may be opened. Consistent with disclosures in the present application, legacy ACL 6 and future ACL 7 may selfheal the records when an update failure is identified.

Change data capture 2 may then process the change request by putting the name change on an event streaming platform such as, for example, KAFKA as a change event. Legacy ACL 6 may then pull the change request and check fut/leg DB 5 to determine whether the record exists from the target platform. Since the target platform has been updated, the record exists in the target platform and the legacy ACL 6 marks the updated record as complete. When the update fails, the fut/leg DB record may be flagged as failed and a service ticket may be opened.

Figure 9:
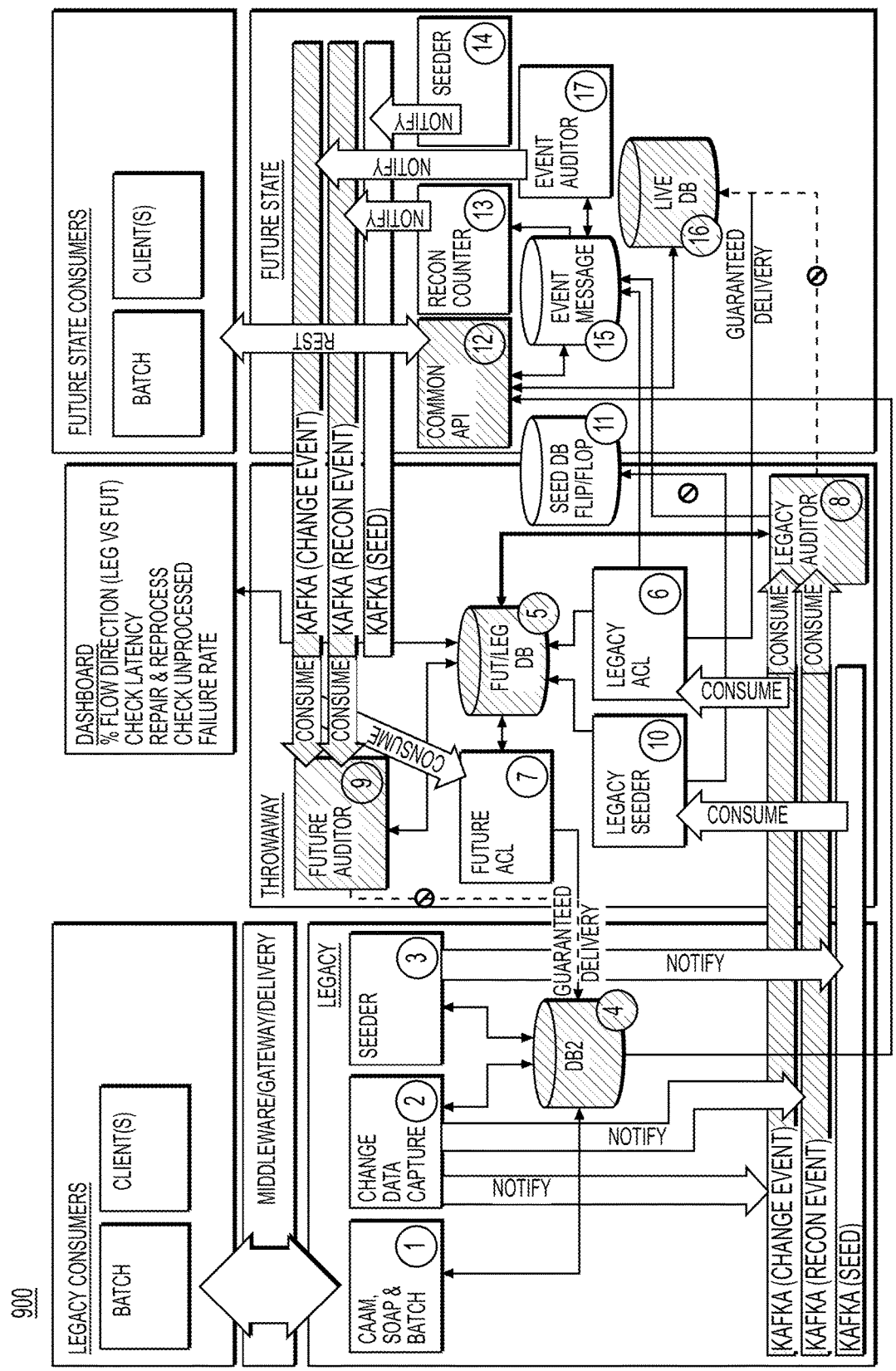
FIG. 9 is a flow diagram of an exemplary auditing process for implementing a method for synchronizing data across a plurality of platforms to facilitate data migration and data reconciliation.

FIG. 9 is a flow diagram 900 of an exemplary auditing process for implementing a method for synchronizing data across a plurality of platforms to facilitate data migration and data reconciliation. In FIG. 9, the name change data may be audited.

As illustrated in FIG. 9, legacy auditor 8 may consume a recon event that contains the event identifiers (IDs) and a count of events that were published from the legacy platform over a specified time window. The legacy auditor 8 may use the recon event data to crosscheck the fut/leg DB 5 to validate that all events during the time window were consumed by the legacy ACL 6. When an event is missing, the legacy auditor 8 may seek the name change event topic at the beginning of the time window and add the missing event IDs to the fut/leg DB 5. Future auditor 9 may then follow the same pattern, but future auditor 9 may reconcile events that were created by the target platform and consumed by the future ACL 7.

Figure 10:
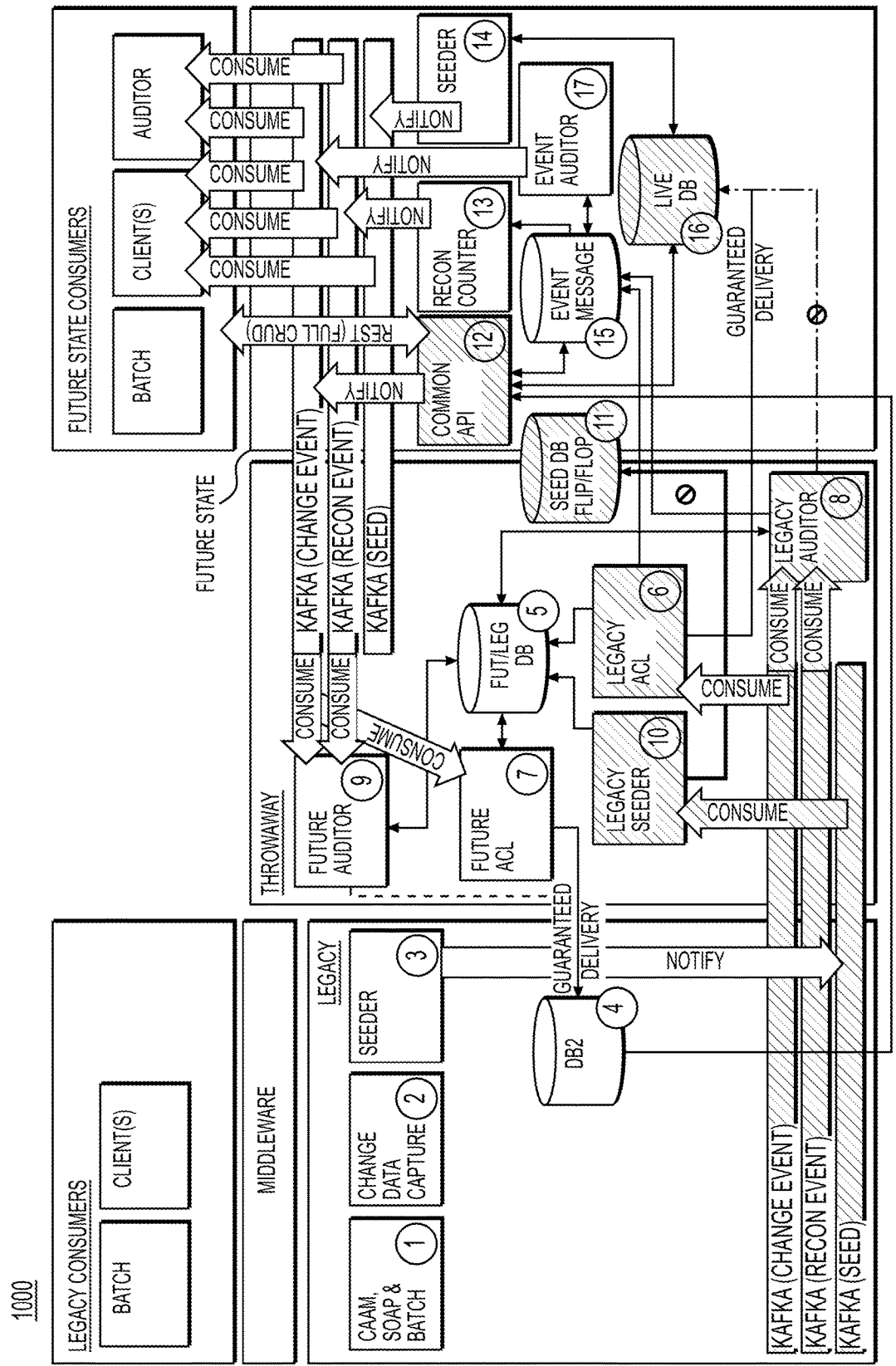
FIG. 10 is a flow diagram of an exemplary initializing and resynching process for implementing a method for synchronizing data across a plurality of platforms to facilitate data migration and data reconciliation.

FIG. 10 is a flow diagram 1000 of an exemplary initializing and resynching process for implementing a method for synchronizing data across a plurality of platforms to facilitate data migration and data reconciliation. In FIG. 10, the database initializing and resynching process may correspond to an interim step that is utilized until the legacy platform is depreciated.

As illustrated in FIG. 10, when the future state DB needs to be rebuilt, legacy ACL 6 may be turned off. Similarly, legacy auditor 8 may also be turned off. The common API 12, which represents the target state application, may be placed in maintenance mode, which only enables get operations. Seed DB 11 may be initialized to load seed DB 11 with seed data via an event streaming platform such as, for example, KAFKA. Then, seed DB 11 and live DB 16 may swap places. Finally, common API 12 may be taken out of maintenance mode.

Accordingly, with this technology, an optimized process for synchronizing data across a plurality of platforms to facilitate data migration and data reconciliation is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating data synchronization across a plurality of platforms, the method being implemented by at least one processor, the method comprising:

retrieving, by the at least one processor, at least one change event, the at least one change event corresponding to an event stream from at least one first platform;

parsing, by the at least one processor, the at least one change event to identify at least one record and at least one data operation;

examining, by the at least one processor, at least one synchronization database to determine whether at least one corresponding record is persisted in a database of at least one second platform;

inserting, by the at least one processor in the at least one synchronization database, the at least one record when the at least one corresponding record is not persisted in the at least one second platform, the inserted at least one record including a change indicator; and updating, by the at least one processor using the at least one synchronization database, the database of the at least one second platform to include the at least one record.

2. The method of claim 1, further comprising:

determining, by the at least one processor after the updating, whether the database of the at least one second platform includes the at least one record;

flagging, by the at least one processor based on a result of the determining, the inserted at least one record in the synchronization database; and generating, by the at least one processor based on the flagging, at least one service ticket, the at least one service ticket including information that relates to at least one from among the result of the determining and the inserted at least one record in the synchronization database.

3. The method of claim 1, further comprising:

generating, by the at least one processor, at least one event message that includes the at least one record; and transmitting, by the at least one processor, the at least one event message to at least one from among the at least one first platform and the at least one second platform to facilitate event auditing.

4. The method of claim 1, wherein the at least one record is translated based on a characteristic of the at least one second platform prior to the updating.

5. The method of claim 1, wherein the change indicator includes at least one identifier that represents at least one from among the at least one first platform and the at least one second platform.

6. The method of claim 5, further comprising:

identifying, by the at least one processor using the change indicator, at least one insertion order for each of a plurality of records in the at least one synchronization database; and determining, by the at least one processor, an event stream direction by using the identified at least one insertion order.

7. The method of claim 1, further comprising:

extracting, by the at least one processor, at least one time value for each of a plurality of records in the synchronization database; and determining, by the at least one processor, at least one latency value based on the extracted at least one time value.

8. The method of claim 1, further comprising:

identifying, by the at least one processor, at least one feature based on a plurality of records in the synchronization database, the at least one feature relating to an individual trait of a data phenomenon; and generating, by the at least one processor using the at least one feature, at least one model, the at least one model representing a pattern of errors that relate to the plurality of records in the synchronization database.

9. The method of claim 8, further comprising:

identifying, by the at least one processor using the generated at least one model, at least one error condition based on the inserted at least one record; and automatically initiating, by the at least one processor, at least one repair action to resolve the identified at least one error condition.

10. The method of claim 1, further comprising:

generating, by the at least one processor, at least one dashboard based on a plurality of records in the at least one synchronization database, the at least one dashboard including information relating to at least one from among an event stream direction, a latency value, an error condition, a repair action, an unprocessed workflow, and an event failure rate; and displaying, by the at least one processor via a graphical user interface, the at least one dashboard.

11. A computing device configured to implement an execution of a method for facilitating data synchronization across a plurality of platforms, the computing device comprising:

a processor;

a memory; and a communication interface coupled to each of the processor and the memory, wherein the processor is configured to:

retrieve at least one change event, the at least one change event corresponding to an event stream from at least one first platform;

parse the at least one change event to identify at least one record and at least one data operation;

examine at least one synchronization database to determine whether at least one corresponding record is persisted in a database of at least one second platform;

insert the at least one record into the at least one synchronization database when the at least one corresponding record is not persisted in the at least one second platform, the inserted at least one record including a change indicator; and update, by using the at least one synchronization database, the database of the at least one second platform to include the at least one record.

12. The computing device of claim 11, wherein the processor is further configured to:

determine, after the updating, whether the database of the at least one second platform includes the at least one record;

flag, based on a result of the determining, the inserted at least one record in the synchronization database; and generate, based on the flagging, at least one service ticket, the at least one service ticket including information that relates to at least one from among the result of the determining and the inserted at least one record in the synchronization database.

13. The computing device of claim 11, wherein the processor is further configured to:

generate at least one event message that includes the at least one record; and transmit the at least one event message to at least one from among the at least one first platform and the at least one second platform to facilitate event auditing.

14. The computing device of claim 11, wherein, prior to the updating, the processor is further configured to translate the at least one record based on a characteristic of the at least one second platform.

15. The computing device of claim 11, wherein the change indicator includes at least one identifier that represents at least one from among the at least one first platform and the at least one second platform.

16. The computing device of claim 15, wherein the processor is further configured to:

identify, by using the change indicator, at least one insertion order for each of a plurality of records in the at least one synchronization database; and determine an event stream direction by using the identified at least one insertion order.

17. The computing device of claim 11, wherein the processor is further configured to:

extract at least one time value for each of a plurality of records in the synchronization database; and determine at least one latency value based on the extracted at least one time value.

18. The computing device of claim 11, wherein the processor is further configured to:

identify at least one feature based on a plurality of records in the synchronization database, the at least one feature relating to an individual trait of a data phenomenon; and generate, by using the at least one feature, at least one model, the at least one model representing a pattern of errors that relate to the plurality of records in the synchronization database.

19. The computing device of claim 18, wherein the processor is further configured to:

identify, by using the generated at least one model, at least one error condition based on the inserted at least one record; and automatically initiate at least one repair action to resolve the identified at least one error condition.

20. The computing device of claim 11, wherein the processor is further configured to:

generate at least one dashboard based on a plurality of records in the at least one synchronization database, the at least one dashboard including information relating to at least one from among an event stream direction, a latency value, an error condition, a repair action, an unprocessed workflow, and an event failure rate; and display, via a graphical user interface, the at least one dashboard.

* * * * *